United States Patent [19]
Hayden

[11] Patent Number: 5,444,031
[45] Date of Patent: * Aug. 22, 1995

[54] PROCESS FOR MAKING CATALYTIC CARBON

[75] Inventor: Richard A. Hayden, Pittsburgh, Pa.

[73] Assignee: Calgon Carbon Corporation, Pittsburgh, Pa.

[ * ] Notice: The portion of the term of this patent subsequent to Oct. 18, 2011 has been disclaimed.

[21] Appl. No.: 7,169

[22] Filed: Jan. 21, 1993

[51] Int. Cl.$^6$ .................... B01J 21/18; C01B 31/12; C01B 31/10
[52] U.S. Cl. .................... 502/180; 502/416; 502/417; 502/423; 502/434; 423/579
[58] Field of Search .............. 502/416, 423, 429, 434, 502/180

[56] References Cited

U.S. PATENT DOCUMENTS

| | | | |
|---|---|---|---|
| 3,909,449 | 9/1975 | Nagai et al. | 252/422 |
| 4,624,937 | 11/1986 | Chou et al. | 502/180 |
| 5,173,466 | 12/1992 | Heins et al. | 502/180 |
| 5,352,370 | 10/1994 | Hayden | 423/244.09 |
| 5,356,849 | 10/1994 | Matviya et al. | 502/417 |

FOREIGN PATENT DOCUMENTS

| | | | |
|---|---|---|---|
| 0490317 | 6/1992 | European Pat. Off. | 502/180 |
| 3620425 | 6/1987 | Germany | B01J 21/18 |
| 4031968A1 | 4/1992 | Germany | B01D 53/56 |
| 015833 | 4/1989 | Japan | B01D 53/36 |

OTHER PUBLICATIONS

J. Wang and W. Xie, "An Appraisal of the Surface Chemistry and the Catalytic Oxidative Activity of Nitrogen-Modified Activated Carbon by XPS," *Cuiha Xuebao* 10 (4), 357 (1989).

H. P. Boehm, A. R. de Rincon, T. Stohr, B. Tereczki, and A. Vass, "Activation of Carbon Catalysts for Oxidation Reactions by Treatment with Ammonia of Hydrogen Cyanide, and Possible Causes for the Loss of Activity During Catalytic Action," *Journal de Chemie Physique* 84, 449 (1987).

Y. Komatsubara, S. Ida, H. Fujitsu, and I. Mochida, "Catalytic Activity of PAN-Bases Active Carbon Fibre (PAN-ACF) Activated with Suphuric Acid for Reduction of Nitric Oxide with Ammonia," *Fuel* 63, 1738 (1984).

L. Singoedjo, F. Kapteijn, J. A. Moulijn, and J. M. Martin-Martines, "Modified Activated Carbon for Low Temperature Selective Catalytic Reduction of NO with NH3," *20th Bien. Conf. on Carbon*, Jun. 23–28, 1991, p. 78.

W. Farmer and J. B. Firth, "The Catalytic Activity of Carbons from Aromatic Hydrocarbons and Some Derivatives," *J. Phys. Chem.* 28, 1136 (1924).

P. F. Bente and J. H. Walton, "The Catalytic Activity of Activated Nitrogenous Carbons," *J. Phys. Chem.* 47, 133 (1943).

J. Watanabe and T. Shiramoto, "Activated Carbon Electrodes for Air-Depolarized Wet Cells III: The Decomposition of Hydrogen Peroxide by Activated Charcoal," *J. Electrochem. Soc. Japan* 20, p. 386 (1952).

E. Naruko, "Ammonia-Activated Charcoal," *Kogyo Kagaku Zasshi* 67(12), 2023 (1964).

I. Mochida, Y. Masumura, T. Hirayama, H. Fujitsu, S. Kawano, and K. Gotoh, "Removal of SO2 in Flue Gas by Polyacylonitrile Based Active Carbon Fiber (PA-N-ACF)," *Nippon Kagaku Kaishi* N4, 269 (1991).

(List continued on next page.)

*Primary Examiner*—Anthony McFarlane
*Attorney, Agent, or Firm*—Titus & McConomy

[57] ABSTRACT

An improved process is provided for the manufacture of a catalytically-active carbonaceous char capable of rapidly decomposing hydrogen peroxide in aqueous solutions. The process of the invention uses a low temperature carbonization and extensive oxidation of a bituminous coal or bituminous coal-like material followed by exposure to a nitrogen-containing compound at high temperatures during the initial calcination and/or activation. The resultant catalytically-active chars have the ability to rapidly decompose aqueous solutions of hydrogen peroxide and are useful for catalytic conversion of $H_2S$, $SO_x$, $NO_x$, chloramines, and/or peroxides in liquid and/or gaseous streams.

14 Claims, 1 Drawing Sheet

OTHER PUBLICATIONS

A. Nishijima, H. Hagiwara, M. Kurita, A. Ueno, T. Sato, Y. Kiyosumi, and N. Todo, "Characterization of Nitrogen-Containing Active Carbon Catalysts for SO2 Removal," *Bull Chem. Soc. Japan 55,* 2618 (1982).

S. K. Naito, S. Takagi, H. Ebata, and S. Takei, "Activation of Carbon Catalysts for Oxidation of Iron (II) Ion in Sulfuric Acid Solution by Oxygen," *Nippon Kagaku Kaishi 4,* 467 (1979).

I. Gavat, C. Costea, and A. Draganescu, "Catalytic Activity of Pyrolized Urea-Formaldehyde Polymers and of Some Melamine and Benzoguanamine Condensation Polymers with Substances Containing CO Groups," *Revue Roumaine de Chimie 12,* 1127 (1967).

K. Boki, S. Tanada, and T. Miyoshi, "Removal by Adsorption of Hydrogen Sulfide by a New Type of Activated Carbon Containing Nitrogen," *Nippon Eiseigaku Zasshi 38(5), 877 (1983).*

H. Sano and H. Ogawa, "Preparation and Application of N-Introduced Carbon II: Application for Removal of Sulfur Oxides from Flue Gas," *Osako Kogy Gijutsu Shikenjo Koho 26,* 92 (1975).

K. Boki, S. Tanada, T. Kita, T. Nakamura, H. Takahashi, and R. Hamada, "Increase in Micropore Volume of N-Containing Activated Carbon Treated with Methylol Melamine Urea Solution," *Experientia 39,* 143 (1983).

S. Tanada, T. Kita, K. Boki, and Y. Kozaki, "Preparation of Narrow Pores Carbon Suitable for Hydrogen Sulfide Asorption," *J. Environ. Sci. Health A20 (1),* 87 (1985).

B. Stohr, H. P. Boehm, and R. Schlogl, "Enhancement of the Catalytic Activity of Activated Carbons in Oxidation Reactions by Thermal Treatment with Ammonia or Hydrogen Cyanide and Observation of Superoxide Species as a Possible Intermediate," *Carbon 29(6),* 707 (1991).

M. Zuckmantel, R. Kurth, and H. P. Boehm, "Carbons as Catlytic Agents for the Oxidation of Sulfurous Acid," *Z. Naturforsch. 34b,* 188 (1979).

Y. Maki, "Relation Between Performances of the Air-depolarized Cell and Catlytic Activity of Charcoals," *J. Electrochem, Soc. Japan (Overseas Ed.),* 27, No. 4–6 E 115 (1959).

R. Manoharan, A. K. Shukla, "Oxygen-Reducing Porous Carbon Electrode for Electrochemical Power Sources with Alakline Electrolytes," *Journal of Power Sources,* 100 (1983) 333–341.

D. M. Drazic and R. R. Adzic, "Influence of Surface Treatment of Active Carbon on Its Activity in Fuel Cell Electrodes," *Flasnik Hemijskog Drustva Beograd,* 349(2–4) 203(10) (1969) CA 73(26):136627.

PROCESS FOR MAKING CATALYTIC CARBON

FIELD OF THE INVENTION

The present invention relates to an improved process for the manufacture of a catalytically-active carbonaceous char from a bituminous coal or a bituminous coal-like material.

BACKGROUND OF THE INVENTION

Carbonaceous chars which are capable of functioning as catalysts per se are well known. The presence of charcoal has been known to enhance a variety of oxidation reactions, including the oxidation of hydrogen sulfide and $SO_2$. In those instances where a carbonaceous char has been observed to affect such reactions, it has functioned generally as a true catalyst, i.e. it affects only the rate of a given reaction but is not itself changed by the reaction to any significant degree. Carbonaceous chars prepared from nitrogen-rich starting materials have been known to be much more effective in catalyzing certain reactions, such as hydrogen peroxide decomposition, than those prepared from nitrogen-poor feedstocks. Similarly, enhanced catalytic properties are known to be imparted into chars prepared from nitrogen-poor starting materials by exposing such chars to nitrogen-containing compounds such as ammonia at high temperatures. More recently, catalytically-active chars have been prepared by the calcination or calcination/activation of low- or high-temperature chars prepared from nitrogen-rich materials such as polyacrylonitrile and polyamide. Catalytically-active chars also have been prepared from nitrogen-poor starting materials by the calcination of high-temperature chars in the presence of nitrogen-containing compounds such as ammonia. In all cases, high-temperature carbonaceous chars are those produced by thermal treatment at temperatures greater than 700° C. Low temperature carbonaceous chars have not been subjected to temperatures greater than 700° C.

Advantages have been found in oxidizing the high-temperature char prepared from nitrogen-poor feedstocks prior to or during exposure to nitrogen-containing compounds. Similarly, oxidizing a low-temperature char prepared from nitrogen-rich feedstocks such as polyacrylonitrile has been found to enhance the catalytic activity.

However, all of the prior art processes for preparing carbonaceous chars which are catalytically active per se have certain disadvantages which limit their overall utility and practicality. For example, nitrogen-rich starting materials, such as polyacrylonitrile or polyamide, are expensive and have been found to generate large amounts of cyanide and other toxic gases upon carbonization. Those processes which use chars derived from nitrogen-poor starting materials invariably use high-temperature chars which require further processing. Since such materials are fairly inert chemically, the use of extensive and aggressive chemical post-treatments is usually required to effect significant changes in their catalytic capabilities. In so doing, such changes are usually brought about only at the expense of carbon yield as reflected in the density of the final product at a given level of catalytic activity. The use of high-temperature chars is, therefore, inevitably more expensive than the direct use of the raw materials from which they are derived. Additionally, such processes entail the use of large amounts of toxic and/or hazardous reagents such as nitric acid, sulfuric acid, and ammonia, and the generation of significant amounts of toxic and/or hazardous byproducts such as sulfur dioxide, nitric oxide, and cyanide.

Accordingly, it is the object of the present invention to provide an improved process for the manufacture of a catalytically-active carbonaceous char wherein the carbonaceous char catalyst is prepared directly from an inexpensive and abundant nitrogen-poor starting material such as a bituminous coal or a bituminous coal-like material. It is further the object of the present invention to limit the use of agents responsible for imparting catalytic activity to the char by performing the essential treatments during the low-temperature transition of the starting material to the final product. These treatments include oxidation of the low-temperature char, preferably by inexpensive, abundant, and relatively non-toxic oxidants, and exposure of the oxidized, low-temperature char to small amounts of inexpensive, abundant, and relatively non-toxic nitrogen-containing compounds during, not after, the initial calcination and condensation of the carbon structure. By this method carbonaceous chars with high catalytic activity per se for a variety of chemical reactions, including, but not limited to, the conversion of peroxides, chloramines, sulfides, sulfur dioxide and nitric oxide, can be manufactured relatively inexpensively and conveniently, with minimal departure from conventional processes for the manufacture of high-temperature carbonaceous chars such as activated carbons and cokes.

SUMMARY OF THE INVENTION

The present invention comprises a process for the manufacture of a carbonaceous char having significant catalyst properties per se wherein the carbon catalyst is prepared directly from an inexpensive and abundant nitrogen-poor feedstock such as a bituminous coal or a bituminous coal-like material such as those derived from higher or lower rank bitumens and coals and ligno-cellulose materials by various chemical treatments. Examples of higher rank coals include anthracite and semi-anthracite coals while examples of lower rank coals include peat, lignite, and sub-bituminous coals. Examples of the chemical treatment of these feedstocks include alkali metal treatment of the high rank materials and zinc chloride or phosphoric acid treatment of the low rank materials. These types of treatments can also be applied to ligno-cellulose materials.

In one preferred embodiment of the invention, the feedstock material is pulverized, mixed, if necessary, with a small amount of a suitable binder such as pitch, briquetted or otherwise formed, and sized. The sized material is then extensively oxidized with an inexpensive, abundant, and relatively non-toxic oxidant such as air at temperatures less than 700° C., preferably less than 400° C. The oxidation is continued until additional gains in the catalytic activity of the final product are no longer evident. The oxidation is well beyond that required to remove the coking properties of typical bituminous coals, and produces an optimally oxidized low-temperature carbonaceous char. Other convenient means of oxidation can also be used to effect the low-temperature oxidation and carbonization of the starting material.

The oxidized low-temperature char is then exposed to small amounts of an inexpensive, abundant, and relatively non-toxic nitrogen-containing compound such as urea during, not after, the initial calcination and condensation of the carbon structure. The amounts of nitrogen-containing compounds used are typically small, preferably less than 5% by weight of the oxidized low-temperature char or such that additional gains in the catalytic activity of the final product are no longer evident. The treatment is carded out by heating the oxidized low-temperature char to high temperatures, preferably between 850° C. and 950° C., in the presence of the nitrogen-containing compound. This heating is preferably conducted under an atmosphere that is inert except for the gases and vapors attributable to the char and/or the nitrogen-containing compound. The heating rate and temperatures are selected such that additional gains in the catalytic activity of the final product are no longer evident.

The nitrogen-treated high-temperature char may then be activated to the desired density at temperatures above 700° C. in steam and/or carbon dioxide, with or without the addition of other gasifying agents such as air. The calcined or calcined/activated char is then cooled in an oxygen-free or otherwise inert atmosphere to temperatures less than 400° C., preferably less than 200° C. Additional gains in catalytic activity may be realized by repeating the oxidation/exposure to nitrogen-containing compounds/calcination or calcination/activation/inert cooling as many times as may be desired. Alternatively, any other method known to generate catalytic activity in high-temperature chars may be applied to the resultant product to further enhance its catalytic activity.

PRESENTLY PREFERRED EMBODIMENTS

Figure 1:
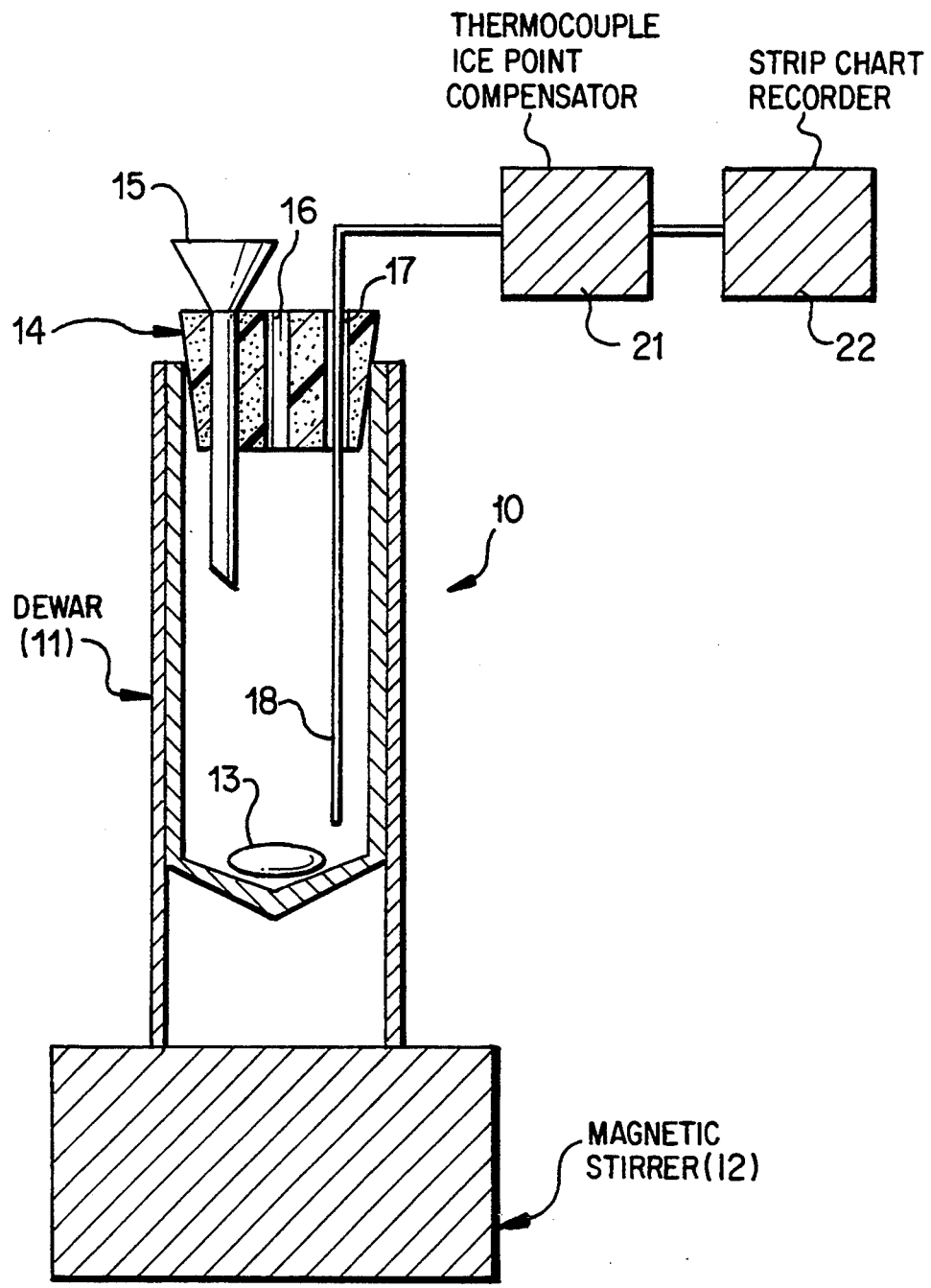
FIG. 1 is a diagrammatic view of a representative apparatus for measuring the catalytic activity of carbonaceous chars.

The following examples illustrate the practice of the invention as well as importance of the extensive oxidation and treatment with a nitrogen-containing compound in the practice of the invention. Example 1 provides a representation of a preferred embodiment of the invention. Comparison of the results of Example 1 to those of Example 2 clearly shows the beneficial effect of extensive oxidation. Likewise, comparison of Example 2 with Example 3 clearly illustrates the importance of the presence of the nitrogen-containing compound during the initial high temperature treatment of the oxidized char. Examples 4–9 provide representations of the practice.

EXAMPLE 1

Bituminous coal was pulverized, mixed with about 4% to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 5 hours, and finally heated from 325° C. to 450° C. at a rate of 125° C. per hour. The resultant oxidized material was cooled to near ambient temperatures in a low oxygen content atmosphere and subsequently impregnated with an aqueous urea solution and dried. The quantity of urea solution used was sufficient to produce a 2% urea loading on a dry weight basis. After impregnation, a portion of the oxidized, impregnated, low-temperature char was rapidly heated to 950° C. under an inert gas atmosphere and maintained at that temperature for 1 hour. Immediately following this calcination treatment the material was contacted with steam, while maintaining a 950° C. temperature, for a sufficient period of time to result in gasification sufficient to achieve an Apparent Density (Test Method TM-7, Calgon Carbon Company, Pittsburgh Pa.) of 0.454 grams per cc. After gasification, the material was cooled to ambient temperature under an inert atmosphere.

The catalytic activity of the resultant sample was determined by measuring the time required for a portion of this carbonaceous char to decompose a given quantity of aqueous hydrogen peroxide. The lower the time, the higher is the level of catalytic activity. In particular, the test measures the elapsed time required for 0.250 grams of carbon to decompose three-fourths of a standard amount of hydrogen peroxide (0.42 moles $H_2O_2$). The elapsed time is referred to as the t-$\frac{3}{4}$ time. This measurement is accomplished using the test procedure defined in U.S. Pat. application Ser. No., filed Jan. 21, 1993 and assigned to the assignee of the present invention, (Atty. Docket No. 92-335) which is incorporated by reference herein and provides the results in terms of t-$\frac{3}{4}$ time. The catalytic activity (t-$\frac{3}{4}$ time) of the carbon described above, when determined using this method, was 4.4 minutes. The t-$\frac{3}{4}$ time was determined in the following manner. With reference to FIG. 1, an apparatus 10 is shown which is useful in conducting the tests of the present invention. Apparatus 10 includes a Dewar 11 (Catalog Number 10-195A, Fisher Scientific, Pittsburgh Pa., or equivalent) positioned on a magnetic stirrer 12 (Model PC-35 1, Coming Hot Plate Stirrer, Corning Scientific Products, Coming, N.Y., or Model 18425 Nuova II Stir Plate, Thermolyne Corporation, Dubuque Iowa, or equivalent) and containing therein a magnetic stir bar 13. A beveled, tightly fitting, closed-cell styrofoam cap 14 is positioned in the top of Dewar 11 and includes a funnel 15, a vent 16 and an opening 17 therethrough and into Dewar 11. Through opening 17 is positioned thermocouple 18 which is electrically connected to ice point compensator 21 and strip chart recorder 22. In practice, the carbonaceous char to be tested is first pulverized such that greater than 90% of the material would pass through a 325 mesh U.S. Standard Series sieve. The styrofoam cap 14 of dewar 11 is removed and a 0.250 gram portion of this pulverized material is placed therein. Deionized water (100 mL) is then added to the Dewar. The addition of this water is performed in such a manner that any pulverized carbonaceous char clinging to the sides of Dewar 11 is carried into the main body of the water in the bottom. Next, a 50 mL aliquot of aqueous buffer solution is added to the Dewar. This buffer solution is 0.50 molar in $K_2HPO_4$ and 0.50 molar in $KH_2PO_4$. At this point magnetic stir bar 13 is placed into the Dewar and the magnetic stirrer is energized. Stirring speed is increased until a vortex greater than about $\frac{1}{2}''$ deep is formed in the mixture and the optimum stirring speed is achieved. The optimum stirring speed is selected such that additional increases in stirring speed do not significantly affect the peroxide decomposition time. Once identified, this optimum stirring speed can be used for all subsequent char samples. If stir bar 13 decouples from the magnetic field before the optimum stirring speed is achieved, it is replaced with a bar which couples more strongly with the magnetic field of the stirrer (12). Optionally, Dewar 11 can be replaced with an equivalent unit that, due to manufacturing variances, positions the stir bar farther into the magnetic field of the stirrer 12. If the stir bar still does not adequately couple with the magnetic field of the stirrer 12, the Dewar can be shortened by removing some of the bottom portion of the outside metal casing. Styrofoam cap 14 is now replaced, and thermocouple 18 ( Type K or J, 1/16" diameter, Inconel sheathed, ungrounded or equivalent) is inserted through styrofoam cap 14 and into the mixture such that a measurement representative of the mixture temperature can be obtained, and the thermocouple ice point compensator 21 (Model MCJ-J or MCJ-K, Omega Engineering, Inc., Stamford, Conn. or equivalent) and strip chart recorder 22 are energized.

The strip chart recorder tracing is monitored until the system is seen to come to thermal equilibrium at ambient temperature. Once thermal equilibrium is achieved, 50 mL of an aqueous hydrogen peroxide solution (0.42 moles $H_2O_2$ per 50 mL) is added, as rapidly as possible, to the Dewar through the funnel 15 in the styrofoam cap. Care is taken to ensure that the hydrogen peroxide solution is at ambient temperature prior to the addition. As the hydrogen peroxide solution is added to the Dewar, the strip chart recorder tracing is marked to indicate the time of addition. The strip chart recorder tracing is then monitored until the tracing indicates that a constant temperature above ambient has been reached. Using the materials and procedures described, this constant temperature is typically about 40° C. greater than ambient temperature. At this point, the styrofoam cap is removed from the Dewar and the action of the stir bar is observed.

If the stir bar is no longer mixing the solution in the desired manner the entire procedure is repeated. If adequate mixing is observed, the elapsed time required for the recorder tracing to reach 75% of its maximum, constant, deflection is determined. This value represents the time required for the catalytically-active carbonaceous char to decompose three-fourths of the available hydrogen peroxide and is referred to as the $t-\frac{3}{4}$ time. This value is reported in units of minutes. Typical values of the $t-\frac{3}{4}$ time for commercial activated carbons are in excess of 30 minutes.

EXAMPLE 2

Bituminous coal was pulverized, mixed with about 4% to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° per hour, then held at 325° C. for 1 hour, and finally heated from 325° C. to 450° C. at a ram of 125° C. per hour. The resultant oxidized material was cooled to near ambient temperatures in a low oxygen content atmosphere and subsequently impregnated with an aqueous urea solution and dried. The quantity of urea solution used was sufficient to produce a 2% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the material was contacted with steam, while maintaining a 950° C. temperature, for a sufficient period of time to result in gasification sufficient to achieve an Apparent Density ( Test Method TM-7, Calgon Carbon Company, Pittsburgh Pa.) of 0.455 grams per cc. After gasification, the material was cooled to ambient temperature under an inert atmosphere. The catalytic activity of this steam-gasified carbonaceous char was determined using the method given in Example 1. The $t-\frac{3}{4}$ time shown by this material was 10.2 minutes.

EXAMPLE 3

Bituminous coal was pulverized, mixed with about 4% to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83 per hour, then held at 325° C. for 1 hour, and finally heated from 325° C. to 450° C. at a rate of 125° C. per hour. The resultant oxidized char was cooled to near ambient temperatures in a low oxygen content atmosphere. A portion of the oxidized low-temperature char was rapidly heated to 950° C. under an inert gas atmosphere and maintained at that temperature for 1 hour. Immediately following this calcination treatment the material was contacted with steam, while maintaining a 950° C. temperature, for a sufficient period of time to result in gasification sufficient to achieve an Apparent Density ( Test Method TM-7, Calgon Carbon Company, Pittsburgh Pa.) of 0.448 grams per cc. After gasification, the material was cooled to ambient temperature under an inert atmosphere. The catalytic activity of this steam-gasified carbonaceous char was determined using the method given in Example 1. The $t-\frac{3}{4}$ time shown by this material was 18.2 minutes.

EXAMPLE 4

A bituminous coal was pulverized, mixed with almost 6% coal tar pitch, and briquetted. The resultant briquettes were crushed and sized to produce an approximately less than 6 mesh size and greater than 16 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 4.5 hours, and finally heated from 350° C. to 450° C. at a rate of 100° C. per hour. The resultant oxidized material was cooled in a low oxygen content atmosphere to near ambient temperatures and subsequently impregnated with an aqueous urea solution and dried. The quantity of urea solution used was sufficient to produce a 4% urea loading on a dry weight basis. After impregnation, portions of the oxidized, impregnated low-temperature char were rapidly heated to 900° C. under an inert gas atmosphere and maintained at that temperature for 1 hour. Immediately following this calcination treatment the portions of the resultant material were activated with steam for various time periods. After activation, the materials were cooled to ambient temperature under an inert atmosphere. Three of the activated carbons so produced, when sized to less than 6 mesh (U.S. Standard Series Sieves) and greater than 16 mesh (U.S. Standard Series Sieves) exhibited Apparent Densities ( Test Method TM-7, Calgon Carbon Company, Pittsburgh Pa.) of 0.589 grams per cc, 0.558 grams per cc, and 0.524 grams per cc. The catalytic activities (t-¾ times) of these three carbons, when determined as in Example 1, are 5.1 minutes for the carbon exhibiting the 0.589 g/cc Apparent Density, 3.8 minutes for the carbon exhibiting the 0.558 g/cc Apparent Density and 3.1 minutes for the carbon exhibiting 0.524 g/cc Apparent Density.

EXAMPLE 5

Bituminous coal was pulverized with about 4% to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83' per hour, held at 325° C. for 5 hours, and finally heated from 325° C. to 450° C. at a rate of 125° C. per hour.

The resultant oxidized material was cooled to near ambient temperature in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the resultant material was activated with steam. Following activation, the material was cooled to ambient temperature under an inert gas atmosphere. The activated carbon so produced, when sized to less than 4 mesh (U.S. Standard Series Sieves) and greater than 6 mesh (U.S. Standard Series Sieves) exhibited an Apparent Density ( Test Method TM-7, Calgon Carbon Company, Pittsburgh PA) of 0.519 grams per cc. The catalytic activity of this carbon was a t-¾ time of 4.5 minutes when determined using the method given in Example 1.

EXAMPLE 6

Bituminous coal as used in Example 5 was pulverized with about 4% to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, held at 350° C. for 5 hours, and finally heated from 350° C. to 450° C. at a rate of 100° C. per hour. The resultant oxidized material was cooled to near ambient temperature in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the resultant material was activated with steam. Following activation, the material was cooled to ambient temperature under an inert gas atmosphere. The activated carbon so produced, when sized to less than 4 mesh (U.S. Standard Series Sieves) and greater than 6 mesh (U.S. Standard Series Sieves) exhibited an Apparent Density (Test Method TM-7, Calgon Carbon Company, Pittsburgh Pa.) of 0.495 grams per cc. The catalytic activity of this carbon was determined using the method given in Example 1. This carbon exhibited a t-¾ time of 4.1 minutes.

EXAMPLE 7

Bituminous coal, as used in Example 5, was pulverized with about 4% to 6% coal tar pitch, and briquetted. The resultant briquettes were crushed and sized to produce an approximately less than 4 mesh size and greater than 10 mesh size (U.S. Standard Series Sieves) material. In the presence of large quantities of excess air, this material was oxidized by heating from 100° C. to 200° C. at a rate of 200° C. per hour, then from 200° C. to 350° C. at a rate of 100° C. per hour, held 4 hours, and finally heated from 350°° C. to 450° C. at a rate of 100° C. per hour. The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the resultant material was activated with steam. The material was then cooled to ambient temperature under an inert gas atmosphere. The activated carbon so produced, when sized to less than 4 mesh (U.S. Standard Series Sieves) and greater than 6 mesh (U.S. Standard Series Sieves) exhibited an Apparent Density (Test Method TM-7, Calgon Carbon Company, Pittsburgh Pa.) of 0.571 grams per cc. This carbon exhibited a t-¾ time of 6.1 minutes when measured by the method given in Example 1.

EXAMPLE 8

A bituminous coal was pulverized with about 6% coal tar pitch. This pulverized material was then intimately blended with 10% powdered corn starch. After blending, 20% water was added to the resultant mixture. This wet mix was then extruded using a ring-die pelletizer to produce pellets of approximately 4 mm diameter. The resultant pellets were then dried and screened to remove fines. In the presence of large quantities of excess air, these pellets were oxidized by heating from 100° C. to 200° C. at a rate of 200° C. per hour, then from 200° C. to 350° C. at a rate of 10 per hour 350° C. for 4.5 hours, and finally heated from 350° C. to 450° C. at a rate of 100° C. per hour. The resultant oxidized char was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of this oxidized, impregnated low-temperature char was rapidly heated to 900° C. under an inert gas atmosphere and maintained at that temperature for 1 hour. Immediately following this calcination treatment the resultant material was activated with steam. Following activation, the material was cooled to ambient temperature under an inert gas atmosphere. The activated carbon pellets so produced were approximately 4 mm in diameter and exhibited an Apparent Density ( Test Method TM-7, Calgon Carbon Company, Pittsburgh Pa.) of 0.420 grams per co. This carbon exhibited a t-¾ time of 3.7 minutes when measured by the method given in Example 1.

EXAMPLE 9

Bituminous coal as used in Example 5 was pulverized with about 4% to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, held at 350° C. for 4 hours, and finally heated from 350° C. to 450° C. at a rate of 100° C. per hour. The resultant oxidized char was cooled to near ambient temperatures in a low oxygen content inert atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the resultant material was activated with steam for approximately 15 minutes. Following activation, this material was cooled to ambient temperature under an inert atmosphere. This slightly activated carbon was then heated to 425° C. and maintained at that temperature for 90 minutes in the presence of excess air. The slightly activated carbon that resulted from this treatment was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the impregnated mildly activated carbon was rapidly heated to 950° C. under an inert gas atmosphere and maintained at that temperature for 1 hour. Immediately following this calcination treatment the resultant material was activated with steam. Following this activation the material was cooled to ambient temperature under an inert gas atmosphere. The activated carbon so produced, when sized to less than 4 mesh (U.S. Standard Series Sieves) and greater than 6 mesh (U.S. Standard Series Sieves) exhibited an Apparent Density (Test Method TM-7, Calgon Carbon Corporation, Pittsburgh Pa.) of 0.575 grams per cc. This carbon exhibited a t-$\frac{3}{4}$ time of 3.9 minutes when measured using the method given in Example 1.

While presently preferred embodiments of the invention have been described in particularity, it may be otherwise embodied within the scope of the appended claims.

What is claimed is:

1. A process for the manufacture of carbonaceous char having catalytic activity which comprises the steps of (a) carbonizing a bituminous coal or a coal having bituminous properties at temperatures below 700° C. in the presence of an oxidant gas; (b) oxidizing said bituminous coal or coal having bituminous properties at temperatures below 700° C. during or after said carbonization; and (c) contacting said carbonized and oxidized bituminous coal or coal having bituminous properties with a nitrogen-containing compound and during said contacting increasing the temperature to above 700° C., to provide said carbonaceous char.

2. The process as set forth in claim 1 including step (d) activating said carbonaceous char at temperatures above 700° C. using one of $H_2O$, $CO_2$, $O_2$ or combinations thereof.

3. The process of claim 1 wherein said step (b) is accomplished electrochemically.

4. The process of claim 1 wherein the said nitrogen-containing compounds are selected from ammonia, urea, melamine, or any derivative thereof.

5. The process of claim 2 wherein steps (c) and (d) are carried out simultaneously.

6. The process of claim 2 wherein step (c) is carried out prior to step (d).

7. The process of claim 1 wherein the carbonaceous char is cooled to temperatures less than 400° C. under substantially oxygen-free or inert atmosphere.

8. The process of claim 2 wherein the activated carbonaceous char is cooled to a temperature less than 400° C. under a substantially oxygen-free or inert atmosphere.

9. The process of claim 7 wherein said carbonaceous char is cooled to a temperature less than 200° C.

10. The carbonaceous char prepared by the process of claim 1.

11. The carbonaceous char prepared by the process of claim 1 wherein the char is one of granular, pellets, shaped, or powdered.

12. The process of claim 8 wherein said activated carbonaceous char is cooled to a temperature of less than 200° C.

13. The carbonaceous char prepared by the process of claim 2.

14. The carbonaceous char prepared by the process of claim 2 wherein said char is one of granular, pellet, shaped, or powdered.

* * * * *